United States Patent
Fouet et al.

(10) Patent No.: US 7,739,043 B2
(45) Date of Patent: Jun. 15, 2010

(54) SYSTEM FOR DISPLAYING ON A FIRST MOVING OBJECT A POSITION INDICATION DEPENDENT ON A POSITION OF A SECOND MOVING OBJECT

(75) Inventors: Guillaume Fouet, Toulouse (FR); Didier Menras, Toulouse (FR); Nicolas Pellatiero, Salunde Provence (FR); Falk Winkler, Cintegabelle (FR)

(73) Assignee: Airbus France, Toulouse (FR)

( * ) Notice: Subject to any disclaimer, the term of this patent is extended or adjusted under 35 U.S.C. 154(b) by 664 days.

(21) Appl. No.: 11/491,483

(22) Filed: Jul. 24, 2006

(65) Prior Publication Data
US 2007/0027623 A1 Feb. 1, 2007

(30) Foreign Application Priority Data
Jul. 27, 2005 (FR) .................................. 05 08009

(51) Int. Cl.
*G01C 21/32* (2006.01)
(52) U.S. Cl. ........................ 701/211; 701/200; 701/207; 701/208; 701/201; 701/215; 244/75.1; 340/945; 340/953; 340/961; 340/990; 340/995.1
(58) Field of Classification Search .................. 701/211, 701/200, 201, 207, 208, 215
See application file for complete search history.

(56) References Cited

U.S. PATENT DOCUMENTS

| 6,018,760 | A  | * | 1/2000 | Oishi et al. ................ 709/204 |
| 6,937,937 | B1 | * | 8/2005 | Manfred et al. .............. 702/2 |
| 7,227,493 | B2 | * | 6/2007 | Oswald et al. ............... 342/70 |
| 7,337,063 | B1 | * | 2/2008 | Oberg et al. ................ 701/213 |
| 7,415,335 | B2 | * | 8/2008 | Bell et al. .................... 701/35 |
| 7,428,450 | B1 | * | 9/2008 | Oberg .......................... 701/4 |
| 2002/0011950 | A1 | | 1/2002 | Frazier et al. |
| 2002/0032528 | A1 | * | 3/2002 | Lai ............................ 701/301 |
| 2002/0133294 | A1 | * | 9/2002 | Farmakis et al. ........... 701/301 |
| 2004/0167709 | A1 | * | 8/2004 | Smitherman et al. ....... 701/208 |
| 2004/0220722 | A1 | * | 11/2004 | Taylor ........................ 701/200 |
| 2004/0257441 | A1 | * | 12/2004 | Pevear et al. ............... 348/144 |
| 2005/0055143 | A1 | | 3/2005 | Doane |
| 2005/0156777 | A1 | | 7/2005 | King et al. |
| 2005/0187677 | A1 | * | 8/2005 | Walker ........................ 701/16 |

FOREIGN PATENT DOCUMENTS

FR 2632755 12/1989
FR 2756960 6/1998

* cited by examiner

*Primary Examiner*—Khoi Tran
*Assistant Examiner*—Jonathan Sample
(74) *Attorney, Agent, or Firm*—Dickinson Wright PLLC

(57) ABSTRACT

System for displaying on a first moving object a position indication dependent on a position of a second moving object.

The system (1) comprises measurement means (2) for carrying out position measurements relating to at least one position dependent on the second moving object, processing means (3) mounted on the first moving object, and connected to the measurement means (2), and intended for the processing of said position measurements so as to produce a characteristic position, a display device (4) mounted on the first moving object, connected to the processing means (3), and presenting on a viewing screen (6), on a display illustrating at least partially the environment of the first moving object, a position indication which is situated at said characteristic position, and triggering means (7) for triggering the implementation of measurements by said measurement means (2).

13 Claims, 8 Drawing Sheets

SYSTEM FOR DISPLAYING ON A FIRST MOVING OBJECT A POSITION INDICATION DEPENDENT ON A POSITION OF A SECOND MOVING OBJECT

This application claims the benefit of priority to French Application No. 0508009, filed Jul. 27, 2005, the entire contents of which are hereby incorporated by reference.

TECHNICAL FIELD OF THE INVENTION

The present invention relates to a system for displaying on a first moving object, in particular a first aircraft object, a position indication dependent on a position of a second moving object, in particular of a second aircraft.

SUMMARY OF THE INVENTION

According to the invention, said system comprises at least:
measurement means for carrying out at least one position measurement;
processing means which are mounted on said first moving object and which are connected to said measurement means, and which are intended for the processing at least of the position measurement carried out by said measurement means so as to produce, upon reception of this position measurement, a characteristic position;
a display device which is mounted on said first moving object, which is connected to said processing means, and which presents, upon the generation of said characteristic position, on a viewing screen, on a display illustrating at least partially the environment of said first moving object, said position indication which is situated at said characteristic position; and
triggering means for triggering the implementation of at least one measurement by said measurement means.

Thus, by virtue of the invention, one is able to display on a display device which is mounted on a first moving object a position indication specified hereinbelow, dependent on a second moving object.

The present invention may be applied to any type of moving object, be it for air, land or sea.

In a preferred embodiment, said system comprises, moreover, a recording means for recording (on an appropriate recording medium) said characteristic position which has been determined by said processing means. This characteristic position is thus accessible to numerous and diverse user devices. The present invention may, consequently, be used in very numerous applications, as specified hereinbelow.

In a first embodiment, said processing means determine, as characteristic position, the relative position between said first moving object and said second moving object.

This relative position between two moving object may be used in very numerous applications, both in the military sector and in the civil sector. In particular, said relative position may be used by a system for maintaining relative position between two aircraft, while allowing in particular at least one aircraft, for example a fighter or acrobatics aircraft, to always maintain the same position with respect to another aircraft, for example a leader aircraft in the case of a formation flight.

In a first variant relating to said first embodiment (characteristic position corresponding to the relative position between the first and second craft):
said measurement means comprise:
a first element which is arranged on said first moving object and which is formed in such a way as to carry out a first position measurement corresponding to the actual position of said first moving object; and
a second element which is arranged on said second moving object and which is formed in such a way as to carry out a second position measurement corresponding to the actual position of said second moving object;
said system furthermore comprises a device for transmitting data between said first and second moving object, which makes it possible to transmit said second position measurement carried out by said second element (on said second moving object) to said processing means which are mounted on said first moving object; and
said processing means determine the relative position between said first and second moving object, on the basis of said first and second position measurements.

Advantageously, said triggering means are formed in such a way as to periodically trigger the position measurements carried out by said measurement means (first and second elements).

As a variant or supplement, said triggering means comprise an interface means which is mounted on the first moving object and which allows an operator, in particular the pilot of said first moving object, to produce at least one triggering order for triggering the measurements carried out by said measurement means (first and second elements), and said system furthermore comprises a device for transmitting data between said first and second moving object, which makes it possible to transmit said triggering order to said second moving object, more precisely to said second element of said measurement means, which is mounted on said second moving object.

In a second variant embodiment relating to said first embodiment (characteristic position corresponding to the relative position between the first and second moving object), said measurement means comprise a third element which is arranged on said first moving object and which is formed so as to measure directly the relative position between said first and second moving object. This relative position corresponds directly to said sought-after characteristic position.

Advantageously, said triggering means are then formed in such a way as to periodically trigger the position measurements carried out by said measurement means (third element).

As a variant or supplement, said triggering means may comprise an interface means which is mounted on said first moving object and which allows an operator, especially the pilot of said first moving object, to produce a triggering order for triggering the measurements carried out by said measurement means (third element).

Additionally, in a second embodiment, said processing means determine, as characteristic position, a fixed position corresponding to a particular geographical position (in three dimensions) related to the trajectory of said second moving object.

This fixed geographical position may be used in very numerous applications, both in the military sector and in the civil sector. This fixed position may, in particular, be used to mark specific points of the trajectory of an aircraft, for example of a military transport plane, corresponding for example to one of the following points:
a drop point;
a start of descent or start of climb point;
an objective point for search or rescue operations; or
a change-of-trajectory point (relating for example to a change of speed, a change of heading, etc.)

In a first variant embodiment relating to said second embodiment (characteristic position corresponding to a fixed geographical position related to the second moving object), said measurement means comprise a second element which is arranged on said second moving object and which is formed in such a way as to carry out a second position measurement corresponding to the actual position of said second moving object, and said system in accordance with the invention furthermore comprises a device for transmitting data between said first and second moving object, which makes it possible to transmit said second position measurement carried out by said second element (mounted on said second moving object) to said processing means which are mounted on said first moving object, said second position measurement corresponding to said fixed position.

Advantageously, said triggering means are formed in such a way as to periodically trigger the position measurements carried out by said measurement means (second element). In this case, preferably, said data transmission device comprises a means for coding the position measurements which are carried out (by said second element) on said second moving object, and which are transmitted periodically to said first moving object (destined for said processing means), in such a way as to be able to easily differentiate them.

As a variant or supplement, said triggering means comprise an interface means which is arranged on said second moving object and which allows an operator to produce a triggering order for triggering the measurements carried out by said measurement means (second element).

Furthermore, in a second variant embodiment relating to said second embodiment (characteristic position corresponding to a fixed geographical position related to said second moving object), said measurement means comprise:

a first element which is arranged on said first moving object and which is formed in such a way as to carry out a first position measurement corresponding to the actual position of said first moving object;

a third element which is also arranged on said first moving object and which is formed in such a way as to measure at the same instant the relative position between said first and second moving object, and said processing means determine said fixed position (relative to said second moving object), on the basis of said position measurement (actual position of the first moving object) and of said measured relative position.

In this case, advantageously, said triggering means are formed in such a way as to periodically trigger the measurements carried out by said measurement means (first and third elements).

As a variant or supplement, said triggering means comprise an interface means which is arranged on said second moving object and which allows an operator, for example the pilot of said second moving object, to produce at least one triggering order for triggering the measurements carried out by said measurement means (first and third elements mounted on the first moving object), and said system furthermore comprises a device for transmitting data between said first and second moving object, which makes it possible to transmit said triggering order to said first moving object (destined for said first and third elements).

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
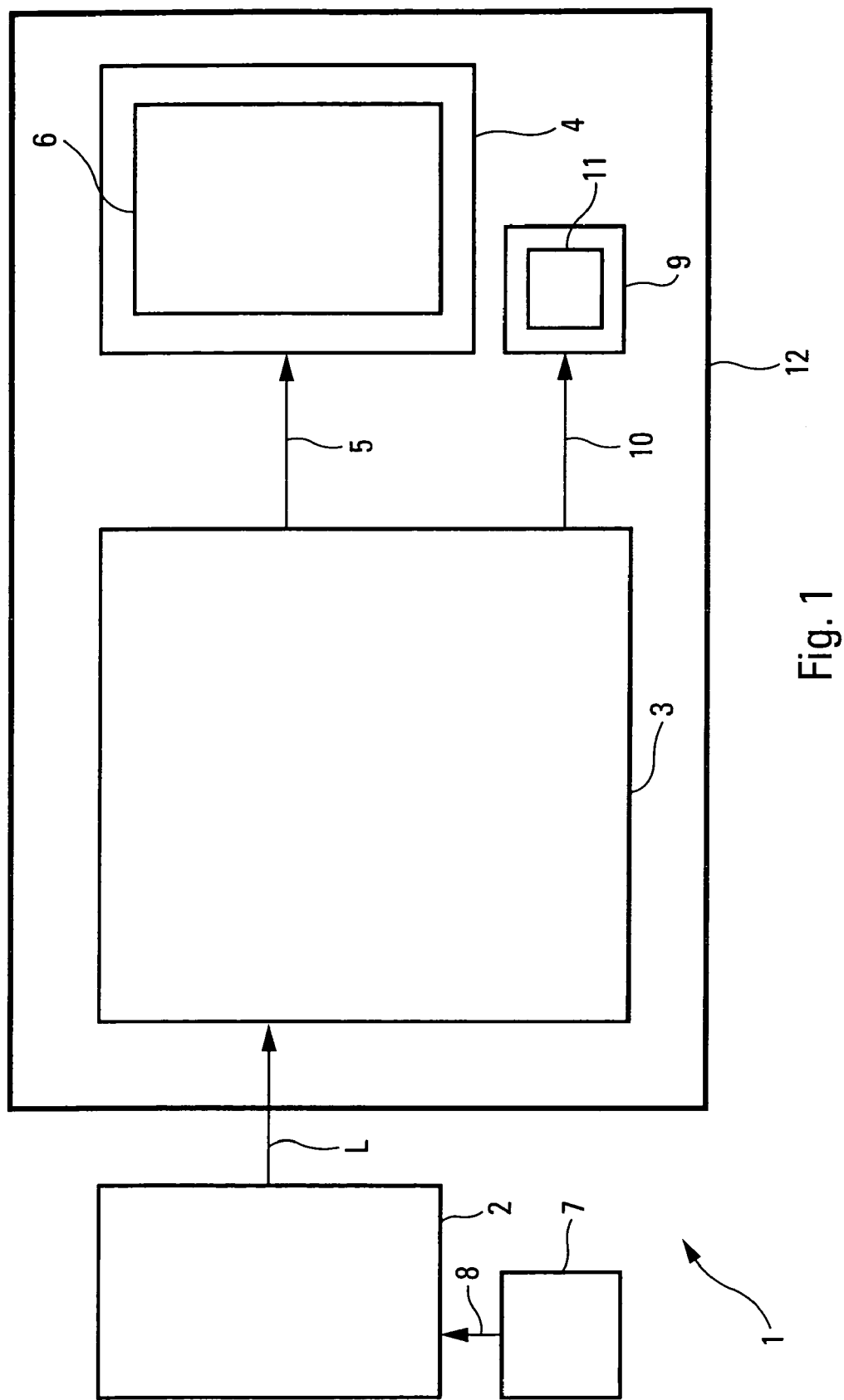
FIG. 1 is the schematic diagram of a system in accordance with the invention.
Figure 4:
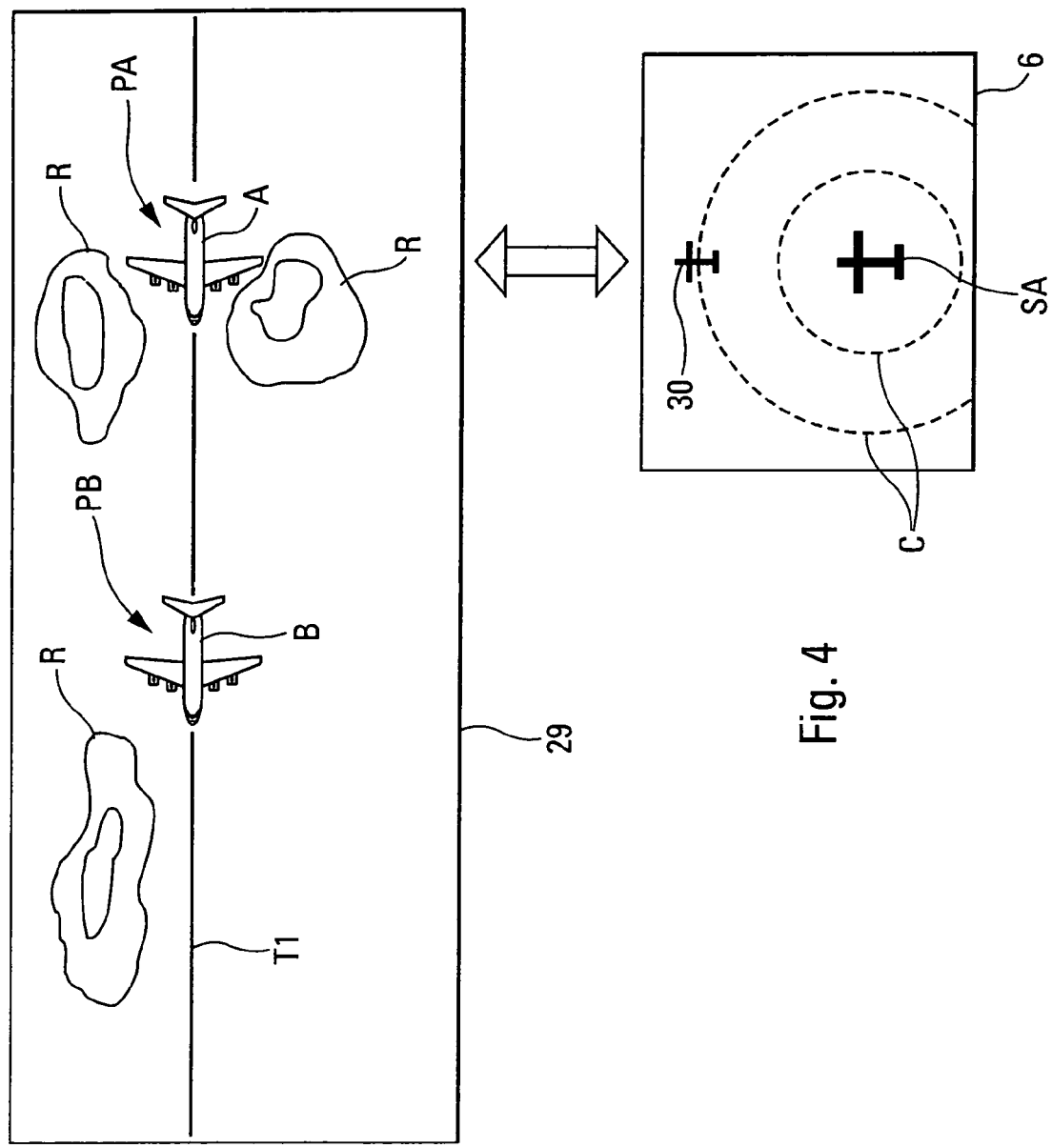
FIG. 4 diagrammatically illustrates the position between two airplanes and a position indication corresponding to this situation, such as obtained by a system in accordance with said first embodiment.
Figure 7:
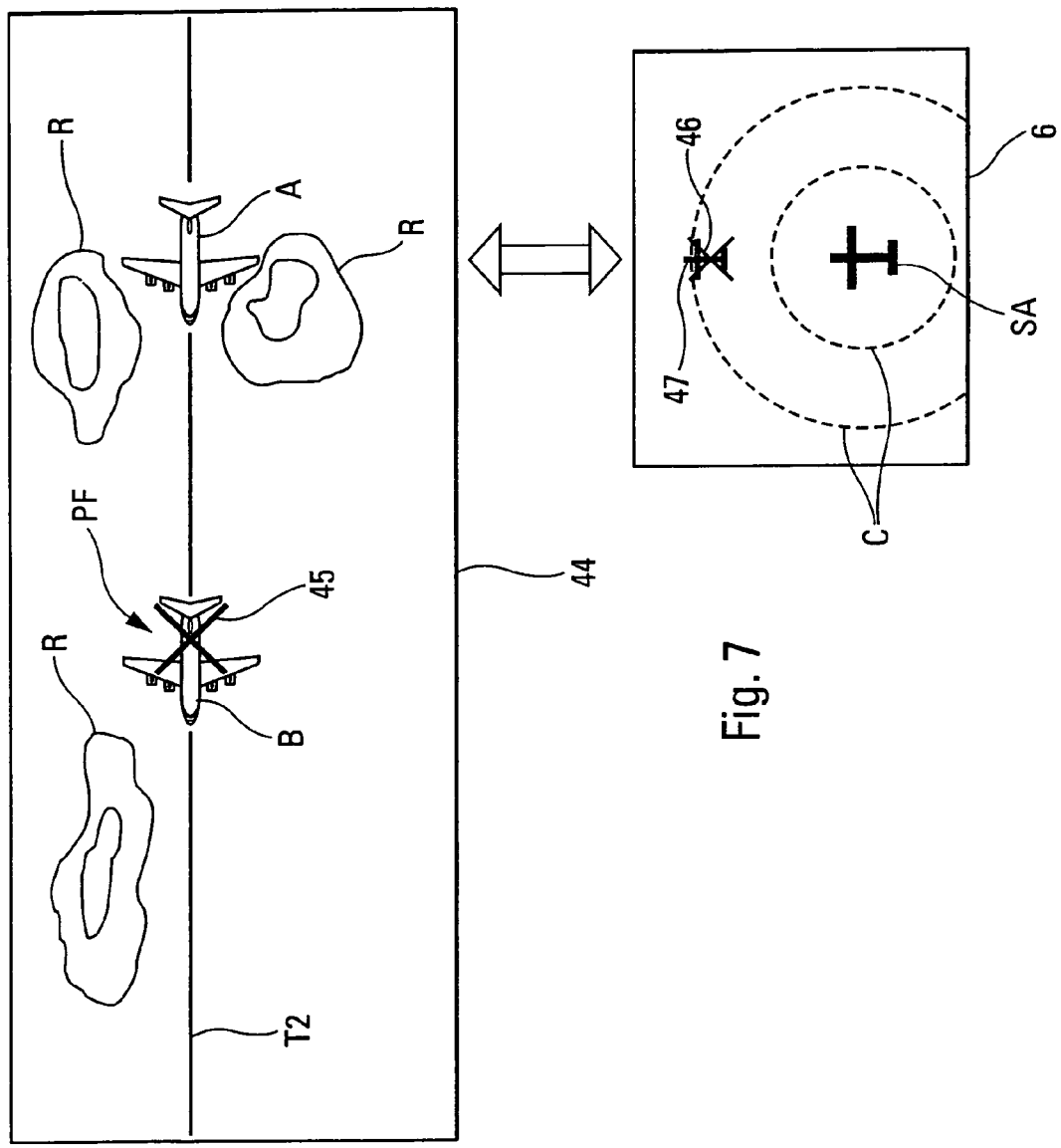
FIGS. 7 and 8 diagrammatically represent two different situations each illustrating the position of two airplanes and a corresponding position indication, such as obtained by a system in accordance with said second embodiment.
Figure 8:
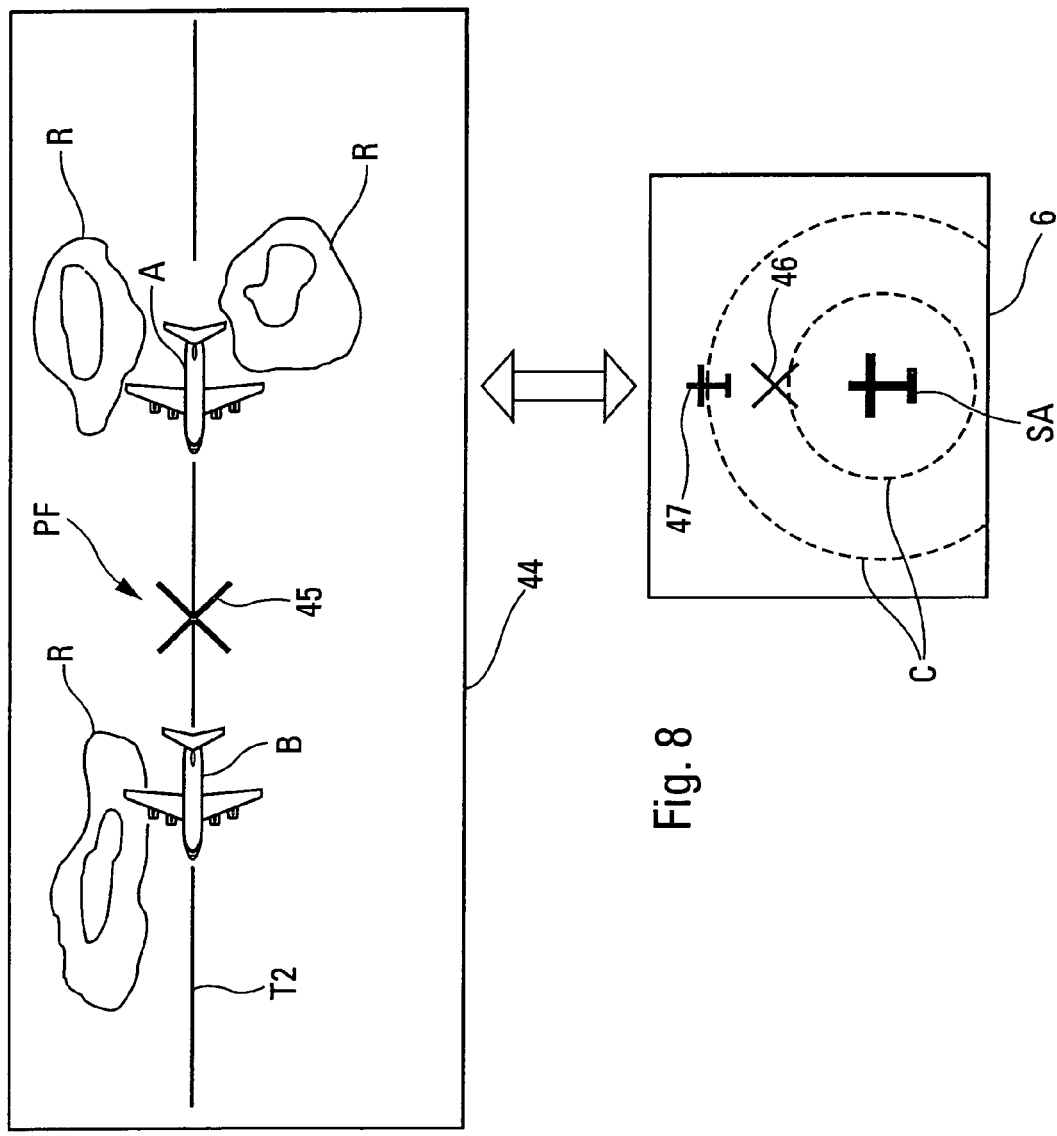

The system 1 in accordance with the invention and represented diagrammatically in a very general manner in FIG. 1, is intended to display on a first moving object A, in particular a first aircraft, a position indication specified hereinbelow and depending on a position of a second moving object B, in particular a second aircraft. In the example of FIGS. 4, 7 and 8, said moving object A and B correspond to airplanes. However, said system 1 may be applied to any type of moving object, that is to say to air, land or sea moving object.

According to the invention, said system 1 comprises at least:

measurement means 2 specified hereinbelow, for carrying out at least one position measurement which relates at least to a position dependent on said moving object B. These measurement means 2 may be mounted on the moving object A and/or on the moving object B, and may be so as a function of the corresponding embodiment, as specified hereinbelow;

processing means 3 which are connected (by a general link L encompassing numerous links specified hereinafter) to said measurement means 2, which are mounted on said moving object A, and which are intended for the processing at least of the position measurement carried out by said measurement means 2, so as to produce, as soon as they receive this position measurement by way of the general link L, a characteristic position specified hereinbelow;

a display device 4 which is mounted on said moving object A, which is connected by way of a link 5 to said processing means 3, and which presents, upon the generation of said characteristic position by said processing means 3 and its reception by way of said link 5, on a viewing screen 6:

a display which illustrates at least partially the environment of said moving object A (on which this display device 4 is mounted); and on this display, a position indication 30, 46 which is situated at the characteristic position determined by said processing means 3; and triggering means 7 specified hereinbelow, which are connected by way of a general link 8 to said measurement means 2 and which are intended for triggering the implementation of at least one measurement (by said measurement means 2).

Thus, the system 1 in accordance with the invention is able to display, on a viewing screen 6 of a first moving object A, a position indication specified hereinbelow, which depends on a second moving object B. This system 1 is therefore a system for aiding the positioning of a moving object.

In a preferred embodiment, said system 1 comprises, moreover, a recording means 9 which is connected by a link 10 to said processing means 3 and which is formed in such a way as to record on a standard recording medium 11 the characteristics, and especially the coordinates, of said characteristic position which was determined by said processing means 3. Moreover, this recording medium 11 is formed in such a way as to be accessible to devices external to said system 1. Thus, said determined and recorded characteristic position may be provided to very numerous and diverse user devices so that the present invention may be employed in very numerous applications, as specified hereinbelow.

The system 1 in accordance with the invention may be embodied in various ways, especially as regards the measurement means 2 and the associated triggering means 7. These means 2 and 7 may, according to the embodiment, be arranged on the moving object A and/or on the moving object B. On the other hand, the processing means 3, the display device 4 and the recording means 9 are always arranged on the same moving object A which is regarded as main moving object within the framework of the present invention. The display obtained by virtue of the present invention is therefore effected on this moving object A and the information obtained by virtue of the invention is presented to the pilot of this moving object A. Also, for reasons of simplification of the drawing, these means 3, 4 and 9 which are always arranged on the moving object A have been grouped together into a set 12 in FIGS. 2, 3, 5 and 6.

In a first embodiment, said processing means 3 determine, as characteristic position, the relative position (in space) between said moving object A and B. It will be noted that, instead of the relative position, it is also possible to take into account the relative distance between these moving object A and B.

The relative position between two moving object A and B may be used in very numerous applications, both in the military sector and in the civil sector. In particular, said relative position may be used by a standard system for maintaining relative position between two aircraft, by allowing in particular at least one aircraft, for example a fighter or acrobatic aircraft (flying in formation), to always maintain the same position with respect to the trajectory of another moving object, for example the leader aircraft.

Figure 2:
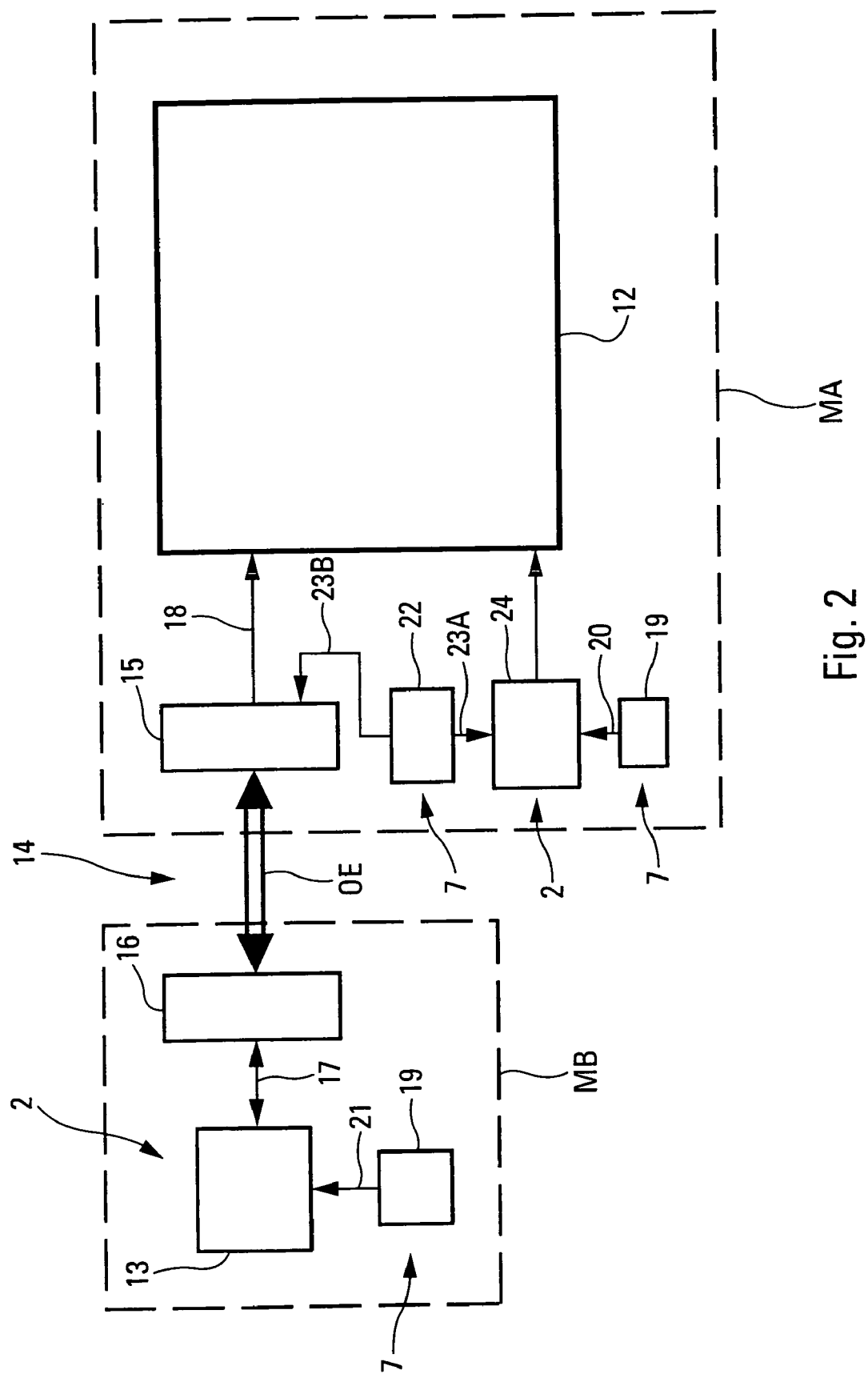
FIGS. 2 and 3 are the schematic diagrams of two different variants of a first embodiment of a system in accordance with the invention.

In a first variant embodiment which relates to said first embodiment (for which the characteristic position corresponds therefore to the relative position between the moving object A and B), and which is represented in FIG. 2:

said measurement means 2 comprise:
an element 24 which is arranged on said moving object A and which is formed in such a way as to carry out a first position measurement corresponding to the current actual position of said moving object A;
an element 13 which is arranged on said moving object B and which is formed in such a way as to carry out a second position measurement corresponding to the current actual position of said moving object B. Said elements 24 and 13 make measurements each time at the same instant, and moreover in the same reference frame (or in two different reference frames, for which the switchover from one to the other is known);
said system 1 moreover comprises a data transmission device 14 which comprises a standard send/receive means 15, mounted on the moving object A and cooperating with a similar send/receive means 16, which is mounted on the moving object B. Said send/receive means 15 and 16 are apt to communicate together by way of electromagnetic waves OE in such a way as to create a link for transmitting data between the two moving object A and B. The data transmission device 14 thus makes it possible to transmit the second position measurement produced by said element 13 (on said moving object B) to said processing means 3 which are mounted on the moving object A. For this purpose, said send/receive means 16 is connected by a link 17 to the element 13, and said send/receive means 15 is connected by a link 18 to the processing means 3 which are mounted on the moving object A; and
said processing means 3 determine, at the level of said moving object A, said relative position between said moving object A and B, on the basis of said first and second position measurements carried out respectively by said elements 24 and 13.

Furthermore, said triggering means 7 may be of manual type or of automatic type.

Firstly, said triggering means 7 may comprise means 19 which are connected respectively by way of links 20 and 21 to said elements 24 and 13 and which are formed in such a way as to periodically trigger the measurements (of position) carried out by these elements 24 and 13. Moreover, said measurements are always carried out in pairs (one measurement per element 24, 13) at the same instant.

In this case, said data transmission device 14 may comprise an appropriate means for coding the position measurements which are carried out on said moving object B, and which are transmitted periodically to said moving object A, in such a way that the processing means 3 can easily differentiate them.

Secondly, namely as a variant or supplement of said means 19, said triggering means 7 may comprise an interface means 22 (for example a keypad or a simple button, or a computer mouse for activating a software command) which is mounted on the moving object A and which allows an operator, especially the pilot of the moving object A, to produce at least one triggering order for triggering the measurements carried out by said elements 24 and 13. In this case, said interface means 22 is connected, on the one hand, directly to said element 24 by way of link 23A and, on the other hand, indirectly to said element 13 by way of a link 23B, of the data transmission device 14 and of the link 17.

Figure 3:
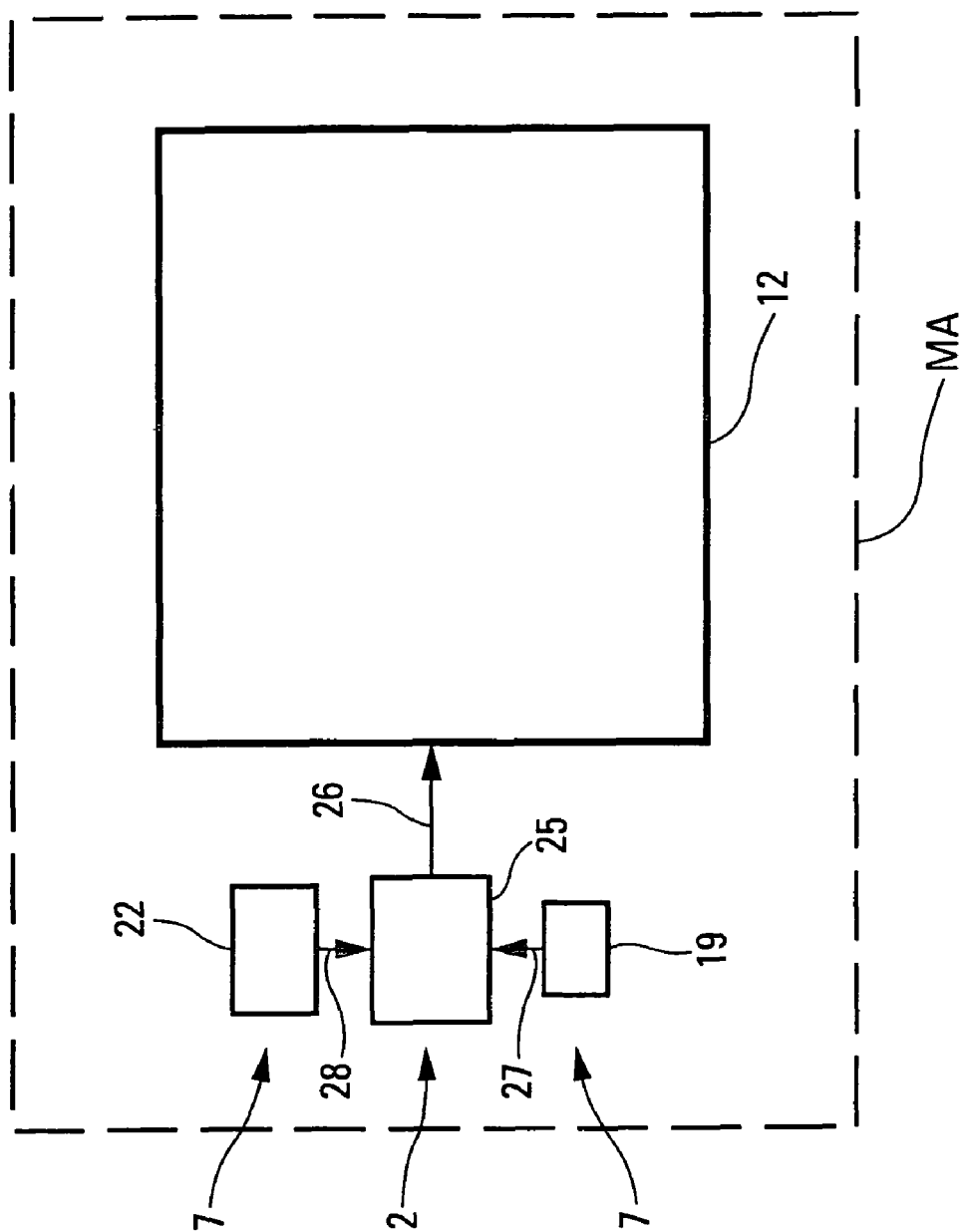

In a second variant embodiment relating to said first embodiment, for which said characteristic position corresponds to the relative position between the moving object A and B, said measurement means 2 comprise, as represented in FIG. 3, an element 25 which is arranged on said moving object A, which is connected by way of a link 26 to the set 12, which comprises for example radio or laser means, and which is formed so as to directly measure the relative position between this moving object A and said moving object B. This relative position therefore corresponds directly to the sought-after characteristic position, so that no calculation is necessary in this case.

In this second variant embodiment, said triggering means 7 may also comprise a means 19 and/or an interface means 22, such as those specified above, which are connected respectively by way of links 27 and 28 to said element 25.

In order to simplify the understanding of FIGS. 2, 3, 5 and 6, we have differentiated on the latter, with the aid of dashed rectangles MA and MB, the elements (rectangle MA) which are mounted on the moving object A from those (rectangle MB) which are mounted on the moving object B.

Additionally, in FIG. 4 is represented, at the level of an upper part 29, a plan view of the two moving object A and B which in this case represent airplanes which are following one another, the moving object (or airplane) B in the lead heading along a flight trajectory T1. In this upper part 29 of FIG. 4 are also represented elements of the relief R. In this case, the characteristic position corresponds to the relative position between the present positions PA and PB (therefore taken at the same instant) of said moving object A and B. This relative position is determined by the system 1 in accordance with the invention and effected according to one of the embodiments represented respectively in FIGS. 2 and 3. In the example represented, the corresponding viewing screen 6, shown on the lower part of FIG. 4, illustrates a display of ND type ("Navigation Display"), according to a so-called "rose" standard mode which shows an airplane symbol SA which is centered with respect to the display of said viewing screen 6 and with which are associated in standard fashion concentric circles C defining a distance scale. According to the invention, the display device 4 displays also, on this viewing screen 6, a characteristic sign 30 which is, for example, displayed in the form of an auxiliary airplane symbol, which corresponds to said position indication and which is disposed on said viewing screen 6 in such a way that the distance between said symbols SA and 30 is proportional, taking account in particular of the display scale of said viewing screen 6, to the distance of the relative position (determined by the system 1 in accordance with the invention) between the current positions PA and PB of said airplanes A and B.

Figure 5:
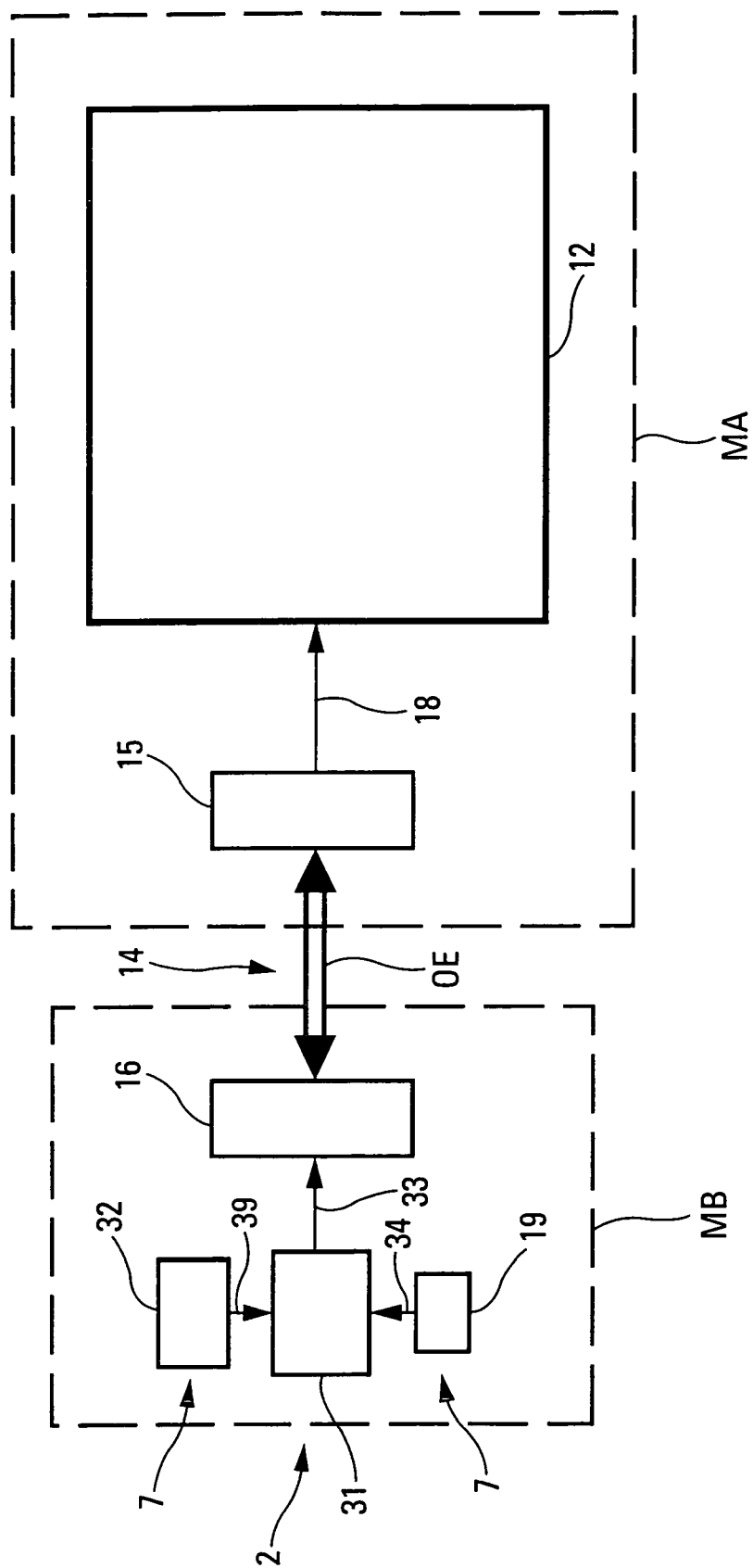
FIGS. 5 and 6 are the schematic diagrams of two different variants of a second embodiment of a system in accordance with the invention.
Figure 6:
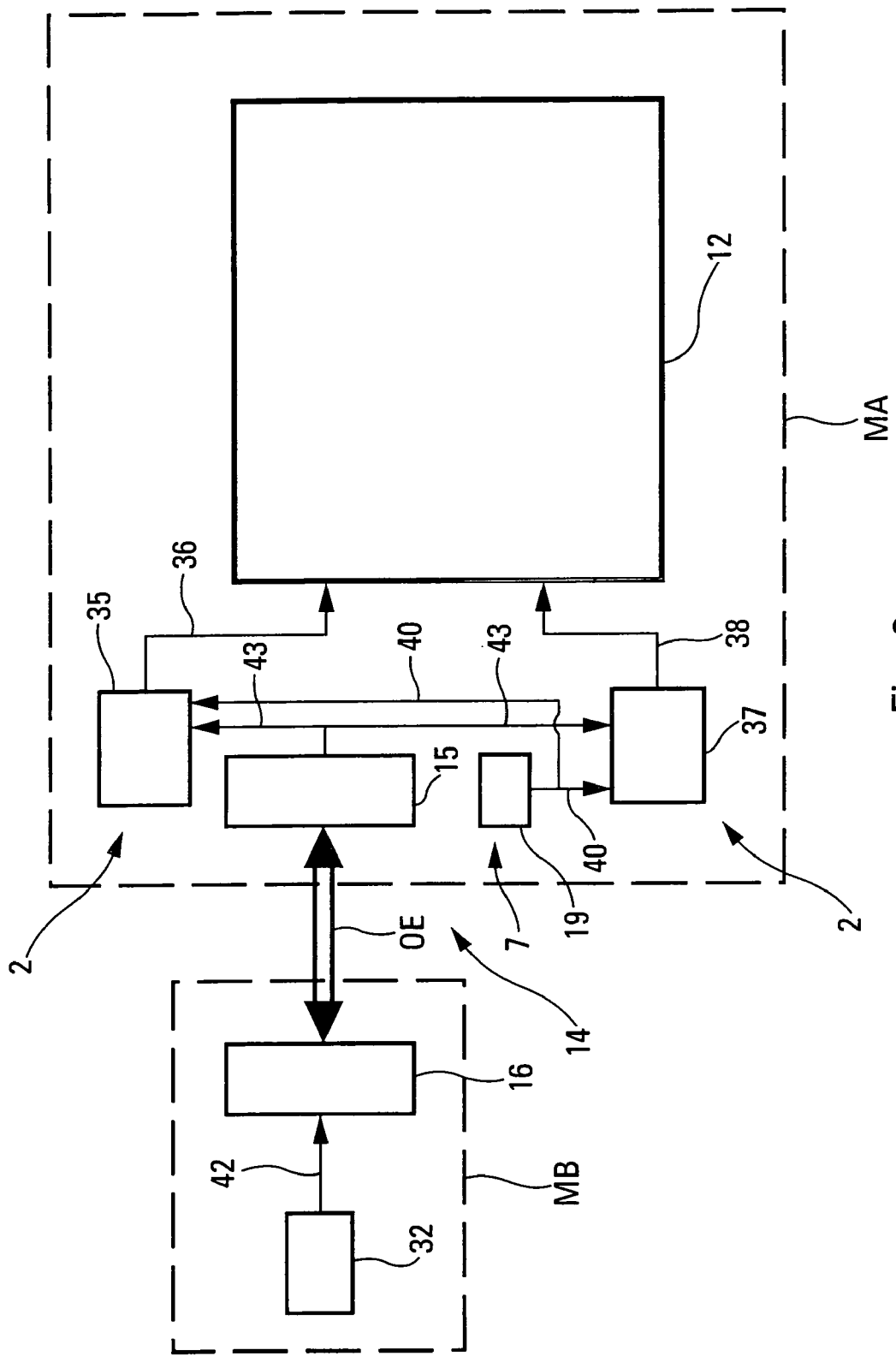

Additionally, in a second embodiment which is represented according to two different variant embodiments in FIGS. 5 and 6, said processing means 3 determine, as characteristic position, a fixed position PF corresponding to a particular fixed geographical position (in three dimensions), which is related to the trajectory T2 of said moving object B.

This fixed geographical position PF may be used in very numerous applications, both in the military sector and in the civil sector. This fixed position PF may, in particular, be used to mark specific points of the trajectory of an aircraft, for example of a military transport plane, corresponding for example to one of the following points:

a drop point;

a start of descent or start of climb point;

an objective point for search or rescue operations; or a change-of-trajectory point (relating for example to a change of speed, a change of heading, etc.).

In a first variant embodiment relating to said second embodiment, for which said characteristic position corresponds to a fixed geographical position PF related to said moving object B, said measurement means 2 comprise, as represented in FIG. 5, an element 31 which is arranged on the moving object B and which is formed in such a way as to carry out a position measurement corresponding to the current position of said moving object B, at the moment of the measurement. The system 1 in accordance with the invention comprises, moreover, a transmission device 14 which is connected by a link 33 to said element 31, which is apt to transmit data between said moving object A and B and which may in particular transmit the position measurement carried out by said element 31 to the processing means 3 which are mounted on the moving object A. The position measurement produced by said element 31 corresponds directly to the sought-after fixed geographical position PF.

Furthermore, in this case, the triggering means 7 which are mounted on the moving object B may also comprise an automatic means 19 for producing a periodic triggering and/or an interface means 32 (which is for example similar to the interface means 22 of FIGS. 2 and 3 and which may comprise in particular a pushbutton or a software command on a display), which are connected respectively by way of links 34 and 39 to said element 31.

In the case of a periodic triggering, said data transmission device 14 moreover comprises an appropriate means for coding the position measurements which are carried out on said moving object B, and which are transmitted periodically to said moving object A, so as to be able to easily differentiate them from one another.

In this first variant embodiment, the measurement and triggering means (means 2 and 7) are therefore mounted on said moving object B, whereas the processing and display means (means 3, 4 and 9) are mounted on the moving object A.

Furthermore, in a second variant embodiment relating to said second embodiment, for which said characteristic position corresponds to a fixed geographical position PF related to said moving object B, said measurement means 2 comprise, as represented in FIG. 6:

an element 35, which is arranged on the moving object A, which is for example similar to the element 24 of FIG. 2, which is connected by way of a link 36 to said set 12, and which is formed in such a way as to carry out a position measurement corresponding to the current actual position of said moving object A; and an element 37, which is for example similar to the element 25 of FIG. 3, which is arranged on said moving object A, which is connected by way of a link 38 to said set 12, and which is formed in such a way as to measure (at the same moment as the element 35) the relative position between the moving object A and B.

In this case, according to the invention, said processing means 3, which receive the measurements carried out at the same time by said means 35 and 37, determine said fixed position PF which is relative to said moving object B, on the basis on the one hand of the current position measurement of said moving object A and, on the other hand, of the relative position measured between said moving object A and B.

The two measurements are therefore carried out at the same moment, at a particular instant, when the moving object B passes said sought-after fixed geographical position PF.

In this case, said triggering means 7 may be formed in such a way as to comprise a means 19 apt to trigger periodically the measurements carried out by the elements 35 and 37, to which it is connected by way of links 40.

Furthermore, said triggering means 7 may also comprise an interface means 32 which is arranged on the moving object B and which allows an operator to produce at least one triggering order for triggering the measurements carried out by said elements 35 and 37 of said measurement means 2. In this case, the system 1 in accordance with the invention furthermore comprises a data transmission device 14, of which the means 16 (mounted on the moving object B) is connected by way of a link 42 to said interface means 32, and of which the means 15 (mounted on the moving object A) is connected by way of a link 43 to said elements 35 and 37. This data transmission device 14 therefore makes it possible to transmit a triggering order which is produced on the moving object B, for example by the pilot of an airplane, and in particular the leader of a formation, to the processing means 3 which are mounted on the moving object A.

FIG. 7 shows the determination of a fixed position PF which is illustrated by a cross 45 on the upper part 44 of this FIG. 7. This fixed position PF (which is determined by the system 1 in accordance with the invention, as described previously in conjunction with FIGS. 5 and 6) is displayed on the viewing screen 6 with the aid of a characteristic sign 46 (or position indication), for example a cross. In the example of FIGS. 7 and 8, the display effected on the viewing screen 6 is of the same type as that effected in FIG. 4 (with an airplane symbol SA and concentric circles C). In the situation of FIG. 7 corresponding to the instant of the measurement, the airplane B is at this position PF, as illustrated by an airplane symbol 47 (representing the airplane B) which is superimposed on said characteristic sign 46 on the viewing screen 6.

This characteristic position PF is therefore a fixed geographical position, that is to say although it is related to the airplane B or to its trajectory T2 at the moment of its generation, it remains fixed and no longer displaces onwards of the moment at which it is produced. Also, as represented in FIG. 8, when the airplanes A and B are moving, this position PF remains invariant. FIG. 8 therefore illustrates an instant subsequent to the situation of FIG. 7. Moreover, as may be seen on the corresponding viewing screen 6, the characteristic sign 46 (illustrating the fixed position PF) and the airplane symbol 47 (illustrating the airplane B) are then no longer superimposed.

The invention claimed is:

1. A system for displaying on a first moving object a position indication dependent on a position of a second moving object, said system comprising:
   a measurement device that carries out at least one position measurement and is arranged exclusively on the first moving object, said measurement device comprising a first element which is configured to carry out a first position measurement, corresponding to the actual position of said first moving object;
   a processing device mounted on said first moving object and connected to said measurement device, said processing device determining a characteristic position which is fixed;
   a display device mounted on said first moving object, which is connected to said processing device, and which presents, upon the generation of said characteristic position, on a viewing screen, on a display illustrating at least partially the environment of said first moving object, said position indication which is situated at said characteristic position; and
   a triggering device that triggers the implementation of at least one measurement by said measurement device, wherein said processing device determines, as a characteristic position, a fixed position which no longer displaces onward at the instant generated and which corresponds to a particular geographical position related to a trajectory of said second moving object, wherein said measurement device comprises a third element which is configured to measure, at a same instant as said first element, a relative position between said first and second moving objects, and wherein said processing device determines said fixed position, on the basis of said first position measurement and of said measured relative position.

2. The system as claimed in claim 1, wherein said triggering device is configured to periodically trigger the measurements carried out by said measurement device.

3. The system as claimed in claim 1, wherein said triggering device comprises an interface device arranged on said second moving object and allows an operator to produce at least one triggering order for triggering the measurements carried out by said measurement device, and wherein said system further comprises a transmitting device that transmits data between said first and second moving object to transmit said triggering order to said first moving object.

4. The system as claimed in claim 1, further comprises a recording device that records said fixed position determined by said processing device.

5. A system for displaying on a first moving object, a position indication dependent on a position of a second moving object, said system comprising:
   a measurement device carrying out at least one position measurement and arranged exclusively on the first moving object, said measurement device comprising a first element configured to carry out a first position measurement, corresponding to the actual position of said first moving object;
   a processing device mounted on said first moving object and connected to said measurement device, said processing device determining a characteristic position which is fixed;
   a display device mounted on said first moving object, which is connected to said processing device, and which presents, upon the generation of said characteristic position, on a viewing screen, on a display illustrating at least partially the environment of said first moving object, said position indication which is situated at said characteristic position; and
   a triggering device triggering the implementation of at least one measurement by said measurement device, wherein said processing device determines, as a characteristic position, a fixed position which no longer displaces onward at the instant of generation and which marks specific points of a trajectory and corresponds to at least one of a drop point, a start of descent or start of climb point, an objective point for search or rescue operations, and a change-of-trajectory point, wherein said measurement device comprises a third element which is configured to measure, at a same instant as said first element, a relative position between said first and second moving object, and wherein said processing device determines said fixed position, on the basis of said first position measurement and of said measured relative position.

6. The system as claimed in claim 1, wherein the first moving object is a first aircraft and the second moving object is a second aircraft.

7. The system as claimed in claim 5, wherein the first moving object is a first aircraft and the second moving object is a second aircraft.

8. The system as claimed in claim 1, wherein the characteristic position remains in a same viewing position on the display device.

9. The system as claimed in claim 5, wherein the characteristic position remains in a same viewing position on the display device.

10. A system for displaying on a first moving object, a position indication dependent on a position of a second moving object, said system comprising:
   a measurement device that carries out at least one position measurement, said measurement device comprising a first element which is arranged on said first moving object and which is configured to carry out a first position measurement, corresponding to the actual position of said first moving object;
   a processing device mounted on said first moving object and connected to said measurement device, said processing device determining a characteristic position which is fixed;
   a display device mounted on said first moving object, which is connected to said processing device, and which presents, upon the generation of said characteristic position, on a viewing screen, on a display illustrating at least partially the environment of said first moving object, said position indication which is situated at said characteristic position; and a triggering device that triggers the implementation of at least one measurement by said measurement device, wherein said processing device determines, as a characteristic position, a fixed position which remains in a same viewing position on the display device from the instant generated and which corresponds to a particular geographical position related to a trajectory of said second moving object, wherein said measurement device comprises a third element which is arranged on said first moving object and which is configured to measure, at a same instant as said first element, a relative position between said first and second moving objects, and wherein said processing device determines said fixed position, on the basis of said first position measurement and of said measured relative position.

11. The system as claimed in claim 10, wherein said triggering device is configured to periodically trigger the measurements carried out by said measurement device.

12. The system as claimed in claim 10, wherein said triggering device comprises an interface device that is arranged on said second moving object and that allows an operator to produce at least one triggering order for triggering the measurements carried out by said measurement device, and wherein said system further comprises a device for transmitting data between said first and second moving object to transmit said triggering order to said-first moving object.

13. The system as claimed in claim 10, further comprising a recording device recording said fixed position determined by said processing device.

* * * * *